(12) United States Patent
Keller et al.

(10) Patent No.: US 12,358,503 B2
(45) Date of Patent: Jul. 15, 2025

(54) METHOD FOR OPERATING AN AUTOMATED VEHICLE

(71) Applicant: MERCEDES-BENZ GROUP AG, Stuttgart (DE)

(72) Inventors: Christoph Keller, Stuttgart (DE); Holger Mielenz, Ostfildern (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 210 days.

(21) Appl. No.: 18/265,487

(22) PCT Filed: Oct. 12, 2021

(86) PCT No.: PCT/EP2021/078189
§ 371 (c)(1),
(2) Date: Jun. 6, 2023

(87) PCT Pub. No.: WO2022/122223
PCT Pub. Date: Jun. 16, 2022

(65) Prior Publication Data
US 2024/0034317 A1    Feb. 1, 2024

(30) Foreign Application Priority Data
Dec. 7, 2020   (DE) .................. 10 2020 007 444.8

(51) Int. Cl.
*B60Q 1/46*         (2006.01)
*B60W 30/16*        (2020.01)
(Continued)

(52) U.S. Cl.
CPC ............ *B60W 30/16* (2013.01); *B60W 50/14* (2013.01); *B60W 2050/143* (2013.01);
(Continued)

(58) Field of Classification Search
CPC ......... B60Q 1/46; B60W 30/16; B60W 50/14; B60W 2050/143; B60W 2050/146;
(Continued)

(56) References Cited

U.S. PATENT DOCUMENTS

| 8,204,678 B2 | 6/2012 | Matsuno |
| 9,586,584 B2 | 3/2017 | Parikh et al. |

(Continued)

FOREIGN PATENT DOCUMENTS

| DE | 19624116 C1 | 8/1997 |
| DE | 102005062275 A1 | 6/2007 |

(Continued)

OTHER PUBLICATIONS

Office Action dated Jun. 11, 2024 in related/corresponding JP Application No. 2023-534215.

(Continued)

*Primary Examiner* — Rachid Bendidi
*Assistant Examiner* — Hossam M Abd el Latif
(74) *Attorney, Agent, or Firm* — PATENT PORTFOLIO BUILDERS PLLC

(57) ABSTRACT

A method for operating an automated vehicle involves recording traffic congestion ahead of the vehicle and determining whether hazard lights of a vehicle following the vehicle in its lane are switched on. When the hazard lights of the following vehicle are switched on, a rear collision risk is evaluated as being lower than when the hazard lights are switched off.

9 Claims, 1 Drawing Sheet

Figure 1:
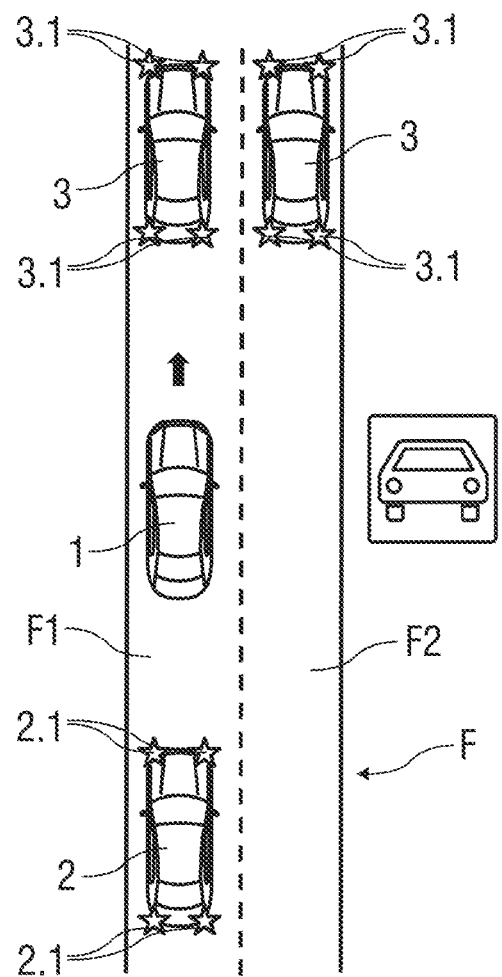

(51) Int. Cl.
*B60W 30/18* (2012.01)
*B60W 40/04* (2006.01)
*B60W 50/14* (2020.01)
*B60W 60/00* (2020.01)

(52) U.S. Cl.
CPC .............. *B60W 2050/146* (2013.01); *B60W 2554/4041* (2020.02); *B60W 2554/4045* (2020.02); *B60W 2554/406* (2020.02); *B60W 2754/30* (2020.02)

(58) Field of Classification Search
CPC . B60W 2554/4041; B60W 2554/4045; B60W 2554/406; B60W 2754/30; B60W 30/18018; B60W 2552/00; B60W 60/0016; B60W 2540/20; B60W 2556/50; B60W 40/04; G08G 1/166
USPC .......................................................... 701/96
See application file for complete search history.

(56) References Cited

U.S. PATENT DOCUMENTS

| | | | | |
|---|---|---|---|---|
| 11,726,437 | B2* | 8/2023 | Chintakindi | B60W 60/0059 701/23 |
| 2017/0320389 | A1* | 11/2017 | Burt | B60K 28/165 |
| 2018/0173237 | A1* | 6/2018 | Reiley | G05D 1/0061 |
| 2018/0326956 | A1* | 11/2018 | Zhu | B60T 17/22 |
| 2019/0126915 | A1 | 5/2019 | Kim | |
| 2020/0039519 | A1 | 2/2020 | Kinoshita et al. | |
| 2023/0166754 | A1* | 6/2023 | Okuno | B60K 35/10 701/23 |

FOREIGN PATENT DOCUMENTS

| | | |
|---|---|---|
| DE | 102009017431 A1 | 10/2009 |
| DE | 102010001304 A1 | 9/2011 |
| DE | 102014013544 A1 | 4/2015 |
| DE | 102017003440 A1 | 10/2018 |
| DE | 102017212972 A1 | 1/2019 |
| DE | 102018009650 A1 * | 6/2019 |
| JP | 2008234489 A | 10/2008 |
| JP | 2011189776 A | 9/2011 |
| JP | 2016536210 A | 11/2016 |
| JP | 2019119310 A | 7/2019 |
| JP | 2020021315 A | 2/2020 |
| JP | 2020147092 A | 9/2020 |
| KR | 20190124069 A | 11/2019 |

OTHER PUBLICATIONS

Office Action dated Dec. 19, 2024 in related/corresponding KR Application No. 2023-7016824.
International Search Report and Written Opinion mailed Jan. 25, 2022 in related/corresponding International Application No. PCT/EP2021/078189.
Office Action created Jun. 16, 2021 in related/corresponding DE Application No. 10 2020 007 444.8.

* cited by examiner

METHOD FOR OPERATING AN AUTOMATED VEHICLE

BACKGROUND AND SUMMARY OF THE INVENTION

Exemplary embodiments of the invention relate to a method for operating an automated vehicle.

A driving assistance system for vehicles is known from DE 10 2009 017 431 A1. The driving assistance system comprises an information recording device for a vehicle driving ahead for detecting information about a vehicle driving ahead. The driving assistance system further comprises an information recording device for a following vehicle for detecting information about a following vehicle. A calculation device for a front collision risk is additionally provided for calculating a front collision risk in relation to the vehicle driving ahead, taking into consideration at least one parameter of a relative speed between the vehicle driving ahead and the vehicle in question. The driving assistance system additionally comprises a calculation device for a rear collision risk for calculating a rear collision risk posed by the following vehicle, taking into consideration at least one parameter of a relative speed between the following vehicle and the vehicle in question, having a greater weight than the weight of the parameter of the relative speed for the front collision risk in relation to the vehicle driving ahead. The driving assistance system additionally has a control unit for carrying out driving control depending on the front collision risk in relation to the vehicle driving ahead and the rear collision risk posed by the following vehicle.

Exemplary embodiments of the invention are directed to a method for operating an automated vehicle.

A method for operating an automated vehicle provides according to the invention that when traffic congestion lying ahead of the vehicle is recorded, it is determined whether hazard lights of a vehicle following the vehicle in its lane are switched on and when the hazard lights of the following vehicle are switched on, a rear collision risk is evaluated as being lower than when the hazard lights are switched off.

The method represents an optimized solution for a vehicle driving in automated driving operation up to an end of traffic congestion, whereby traffic safety can be increased and a danger of collision can be estimated. A readiness of the following vehicle to brake, which is recognized using the switched-on hazard lights, is used to reduce a collision risk in relation to a vehicle driving ahead that forms the end of the traffic congestion.

As the vehicle recognizes traffic congestion lying ahead, a deceleration of the vehicle can correspondingly be pre-emptively initiated so that comfort for occupants of the vehicle can be increased.

In an embodiment of the method, the traffic congestion is recognized using activated brake lights and/or switched-on hazard lights of vehicles driving ahead, whereby traffic congestion can substantially be reliably recognized so that in the next step, it is determined whether the following vehicle switches on its hazard lights and a collision risk is correspondingly evaluated. Alternatively, or in addition, the traffic congestion, in particular the end of the traffic congestion, can also be detected using other suitable information, for example using relative speeds and/or spacing changes.

When the hazard lights of the following vehicle are switched on, in a development of the method, a spacing of the vehicle from a vehicle driving ahead is increased so that the collision risk of a frontal collision of the vehicle with the vehicle driving ahead can be excluded as far as possible.

The method additionally provides that when the hazard lights of the following vehicle are not switched on, the vehicle decreases its spacing from a vehicle driving ahead, so that an acceleration of the vehicle in the event of a rear collision with the following vehicle is as low as possible and acting collision forces are absorbed by deformation.

The spacing from the vehicle driving ahead is preferably defined as a time gap. A time gap should be understood to mean a length of time in which two vehicles following one after the other pass a particular point. The time gap corresponds, in particular, to the length of time that the vehicle requires to traverse the free stretch to the vehicle driving ahead. The spacing from the vehicle 3 driving ahead is thus a temporal spacing.

In a further embodiment, occupants of the vehicle are visually and/or acoustically informed about the traffic congestion so that the occupants are made aware of a potentially occurring critical situation and/or of a potential delay to their journey. In relation to the critical situation, and as the occupants have been informed of the present situation, the occupants can adopt an upright position, such that a restraining effect of occupant protection means is pre-conditioned in the event of a rear collision and/or of a frontal collision occurring.

In a possible development, the occupants are additionally visually and/or acoustically informed of a potentially occurring abrupt braking maneuver of the vehicle, so that the occupants can adopt an optimized sitting position in relation to the occupant protection means.

Hazard lights of the vehicle are preferably switched on when the traffic congestion is recorded. The following traffic is thus informed of the potentially occurring abrupt braking maneuver of the vehicle.

Exemplary embodiments of the invention are explained in more detail in the following with reference to the drawings.

BRIEF DESCRIPTION OF THE DRAWING FIGURES

Figure 2:
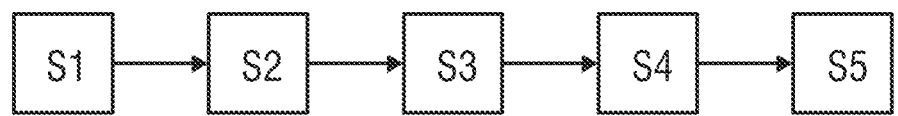

In the figures:

FIG. 1 schematically shows a vehicle driving up to an end of traffic congestion and a vehicle following said vehicle and FIG. 2 schematically shows a sequence of a method for operating an automated vehicle in the case of traffic congestion lying ahead of said vehicle.

Parts corresponding to one another are provided with the same reference numerals in all figures.

DETAILED DESCRIPTION

FIG. 1 shows a road portion F having two lanes F1, F2 running in the same direction, wherein a vehicle 1 is driving towards an end of traffic congestion in a left lane F1 and a following vehicle 2 is located behind the vehicle 1 in the same lane F1.

Two vehicles 3 driving ahead form the end of the traffic congestion, the vehicles having switched on their hazard lights 3.1 to indicate the end of the traffic congestion.

The vehicle 1 driving towards the end of the traffic congestion is driving in automated driving operation, wherein a driving task is being carried out entirely by the vehicle 1 itself. For example, the vehicle 1 is a so-called robotaxi or a so-called robotruck.

In order to ensure as far as possible that the autonomous vehicle 1 reacts in the same way as a manually operated vehicle driving towards an end of traffic congestion to at least reduce an existing collision risk, or at least a collision severity in relation to the following vehicle 1 and the vehicles 3 driving ahead, a method described in the following and on the basis of a sequence depicted in FIG. 2 is provided.

In a traffic situation as depicted in FIG. 1, which can also be described as a danger situation, the goal is to avoid both a rear collision with the following vehicle 2 and a frontal collision between the vehicle 1 and the vehicle 3 driving ahead of the vehicle 1 in its lane F1.

This can lead to a target spacing of the vehicle 1 from the vehicle 3 driving ahead being selected to be comparatively low if the rear collision with the following vehicle 2 is simultaneously to be avoided.

The method provides that in a first method step S1, traffic congestion lying ahead of the vehicle 1 is recognized using recorded signals of sensors of an environment sensor system of said vehicle.

In particular, the environment sensor system has at least one radar-based sensor that continuously records signals in the driving operation of the vehicle 1, and using the signals, for example, the vehicle 3 driving ahead and parameters of a road geometry are determined.

The environment sensor system can additionally have at least one lidar-based sensor, which is also provided for detecting at least the vehicles 3 driving ahead and the parameters of the road geometry.

The environment sensor system further comprises at least one camera that continuously records image signals in the driving operation of the vehicle 1, the recorded image signals being evaluated to the effect that the vehicles 3 driving ahead and the parameters of the road geometry are determined, wherein it is additionally determined using the image signals that the two vehicles 3 driving ahead have respectively activated their hazard lights 3.1.

By means of at least one suitable sensor and/or by means of a suitable camera of the environment sensor system, it is determined using correspondingly recorded signals and/or image data that a following vehicle 2 is located behind the vehicle 1.

The recorded signals and image signals of the sensors and the camera are merged in a further method step S2, wherein it is determined using the merging that a following vehicle 2 having switched-on hazard lights 2.1 is located behind the vehicle 1 and vehicles 3 driving ahead with switched-on hazard lights 3.1 are located in front of the vehicle 1.

A geometry of the road around the vehicle 1 is additionally determined using the merging and data of a road topology of the road portion F available by means of a digital road map is used.

In a third method step S3, an environment model is produced that accounts for relationships between the vehicles 1 to 3 and the road portion F.

A fourth method step S4 relates to planning and deciding, wherein a traffic congestion situation towards which the vehicle 1 is driving is determined using the vehicles 3 driving ahead and in particular using the switched-on hazard lights 3.1.

It is additionally provided in relation to the fourth method step S4 that it is envisaged to inform occupants of the vehicle 1 of the present traffic congestion situation and a possibly more abrupt braking maneuver. The occupants thus have the possibility of preparing themselves for such a braking maneuver and optionally sitting up straight to optimize a restraining effect of occupant protection means.

It is additionally planned to switch on hazard lights of the vehicle 1 to make following traffic aware of the traffic congestion situation, in particular the end of the traffic congestion.

It is additionally planned to determine whether the following vehicle 2 has switched on its hazard lights 2.1 so that a probability that a vehicle user of the following vehicle 2 is informed in relation to the traffic congestion lying ahead is comparatively high. Further, if the following vehicle 2 has switched on its hazard lights 2.1, a probability that the following vehicle 2 reduces its current driving speed with a greater deceleration, without the risk of a rear-end collision between the following vehicle 2 and the vehicle 1 arising, is also comparatively high if the hazard lights 2.1 are switched on.

In a fifth method step S5, as has been planned in the fourth method step S4, the occupants of the vehicle 1 are informed by means of output of an acoustic and/or visual signal that the vehicle 1 is changing, in particular significantly reducing, its current driving speed.

This is preceded by the vehicle 1 calculating a deceleration trajectory for nearing the end of the traffic congestion formed by the two vehicles 3 driving ahead, wherein it is assumed that the following vehicle 2 reacts to a greater deceleration of the vehicle 1 without the danger of a rear-end collision arising for the vehicle 1.

The vehicle 1 additionally switches on its hazard lights (not depicted in more detail) and a change to its current driving speed is initiated. The occupants are also informed that a braking maneuver initiated may possibly be stronger than a so-called comfort braking.

Thus, if it is determined using the switched-on hazard lights 2.1 of the following vehicle 2 that said following vehicle is prepared to brake, the vehicle 1 can increase its target spacing from the vehicle 3 driving ahead in its lane F1 to reduce a risk of collision with the vehicle 3 driving ahead. A preparation of the following vehicle 2 to brake is thus used to reduce the collision risk with the vehicle 3 driving ahead. The target spacing is a set spacing that the vehicle 2 should maintain from the vehicle 3 driving ahead. The target spacing is maintained by means of a spacing rule, for example, which keeps the spacing of the vehicle 1 from the vehicle 3 driving ahead to the target spacing. The target spacing is advantageously defined as a set time gap. A time gap should be understood to mean a length of time that the vehicle 1 requires to traverse the currently free stretch between the vehicle 1 and the vehicle 3 driving ahead. When the hazard lights 2.1 of the following vehicle 2 are switched on or not switched on, the time gap from the vehicle 3 driving ahead is thus increased or, respectively, decreased.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the inven-

The invention claimed is:

1. A method for operating an automated vehicle, the method comprising:
   recording, by the automated vehicle, an area in front of the automated vehicle;
   determining, based on the recording of the area in front of the automated vehicle, that traffic congestion lies ahead of the automated vehicle;
   determining, when it is determined that the traffic congestion lies ahead of the automated vehicle, whether hazard lights of a following vehicle following the automated vehicle in a same lane as the automated vehicle are switched on; and
   determining that a rear collision risk is lower when the hazard lights of the following vehicle are switched on than when the hazard lights of the following vehicle are switched off,
   wherein when the hazard lights of the following vehicle are switched on, the automated vehicle increases its spacing from a vehicle driving ahead of the automated vehicle.

2. The method of claim 1, wherein the traffic congestion is detected using activated brake lights or switched-on hazard lights of vehicles driving ahead of the automated vehicle.

3. The method of claim 1, wherein when the hazard lights of the following vehicle are not switched on, the automated vehicle decreases its spacing from a vehicle driving ahead of the automated vehicle.

4. The method of claim 3, wherein the spacing from the vehicle driving ahead is defined as a time gap.

5. The method of claim 1, further comprising:
   visually or acoustically informing occupants of the automated vehicle about the traffic congestion.

6. The method of claim 1, further comprising:
   visually and/or acoustically informing occupants of the automated vehicle of a potentially occurring abrupt braking maneuver of the automated vehicle.

7. The method of claim 1, wherein when the traffic congestion lying ahead of the automated vehicle is recorded, hazard lights of the automated vehicle are switched on.

8. A method for operating an automated vehicle, the method comprising:
   recording, by the automated vehicle, an area in front of the automated vehicle;
   determining, based on the recording of the area in front of the automated vehicle, that traffic congestion lies ahead of the automated vehicle;
   determining, when it is determined that the traffic congestion lies ahead of the automated vehicle, whether hazard lights of a following vehicle following the automated vehicle in a same lane as the automated vehicle are switched on; and
   adjusting operation of the automated vehicle when it is determined that the hazard lights of a following vehicle following the automated vehicle in a same lane as the automated vehicle are switched on, wherein the operation of the vehicle is adjusted based on a rear collision risk being lower when the hazard lights of the following vehicle are switched on than when the hazard lights of the following vehicle are switched off,
   wherein the adjusting of the operation of the vehicle comprises increasing a spacing from a vehicle driving ahead of the automated vehicle when the hazard lights of the following vehicle are switched on.

9. The method of claim 8, wherein the adjusting of the operation of the vehicle comprises decreasing a spacing from a vehicle driving ahead of the automated vehicle when the hazard lights of the following vehicle are not switched on.

* * * * *